No. 709,250. R. W. WHITNEY. Patented Sept. 16, 1902.
PHOTOGRAPHIC EXPOSURE METER.
(Application filed Aug. 8, 1901.)
(No Model.)
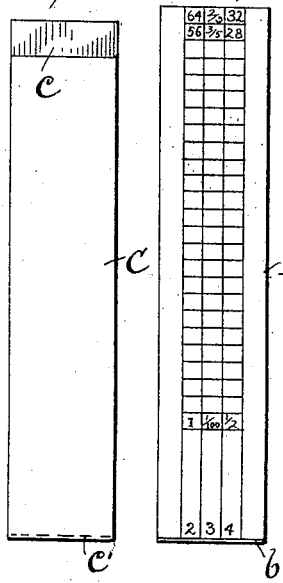
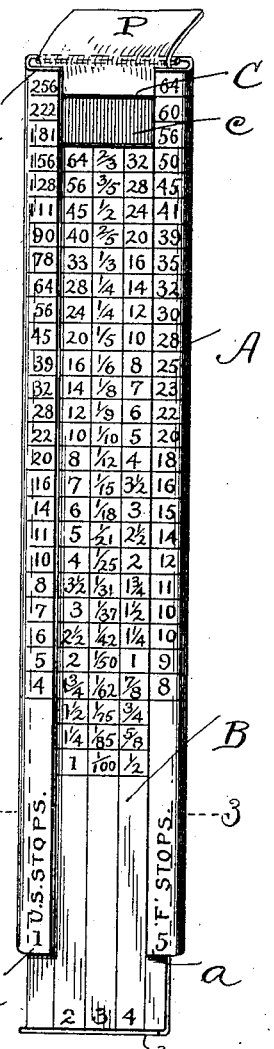
Witnesses
E. B. Gilchrist
E. B. Donnelly
Inventor
Ruel W. Whitney

UNITED STATES PATENT OFFICE.

RUEL W. WHITNEY, OF CLEVELAND, OHIO.

PHOTOGRAPHIC-EXPOSURE METER.

SPECIFICATION forming part of Letters Patent No. 709,250, dated September 16, 1902.

Application filed August 8, 1901. Serial No. 71,410. (No model.)

*To all whom it may concern:*

Be it known that I, RUEL W. WHITNEY, a citizen of the United States, residing at Cleveland, county of Cuyahoga, and State of Ohio, have invented certain new and useful Improvements in Photographic-Exposure Meters; and I hereby declare the following to be a full, clear, and exact description of the invention, such as will enable others skilled in the art to which it pertains to make and use the same.

This invention relates to improved devices not for calculating, but for showing photographic exposures of that class in which the light is first tested by an actinometer in the usual manner and the time of photographic exposure shown therefrom. It is well known that the duration of exposure depends upon the amount of light admitted to a sensitive plate and also upon the sensitiveness of the plate itself. Other conditions affecting the proper time of exposure may also enter into it, such as the color of the subject photographed, &c.; but the principal factors are the sensitiveness of the plate and the amount of light admitted to it.

Various devices have been invented for calculating the proper exposure time; but I am not aware that any have been made embodying the combination of the "U S" or uniform system and the "F" or focal system of stops or diaphragms and showing the correct exposure time in one table for both systems, the exposure time being shown at once from the actinometer time.

In the drawings, Figure 1 is a perspective view of my device enlarged. Fig. 2 is a side or edge view, in central section, enlarged. Fig. 3 is a sectional view on the line 3 3, Fig. 1, enlarged. Figs. 4, 5, and 6 are different views of my device. Fig. 7 is a view of the sensitized paper used in my actinometer.

Like letters refer to like parts throughout.

My device consists of a holder A, formed by turning over the two edges of a strip of brass or other suitable material, so as to form lips $a\,a$, and upon these lips are stamped or otherwise impressed tables of figures representing stops or diaphragms, the "U S" system upon one side and the "F" system upon the other, the equivalent stops being placed directly opposite each other. A slide B, containing tables of figures, has an upward flange $b$ for the purpose of withdrawing it. This slide runs in the holder and is held in position by the lips $a\,a$. For convenience I number the columns of figures, calling each set a column, commencing with those on the left-hand lip, as follows: "1," "2," "3," "4," and "5." Numbers "1" and "5" represent the tables of stops. Number "2" represents the actinometer-table, showing the time it has taken to match the standard tint mentioned hereinafter. Numbers "3" and "4" represent the photographic-exposure times as shown from the actinometer time. In the bottom of the holder A, I place a piece of sensitized paper P and over this a slide C, having on one end a color $c'$, which I designate as a "standard tint," and on the other end a flange $c'$ for the purpose of withdrawal. Over this slide I place the slide B, having the tables of figures, and the meter is complete for use.

To use, withdraw the slide B sufficiently far to expose the tinted end of the slide C and draw the sensitized paper P forward about an eighth of an inch and count the number of seconds it takes the paper to match the standard tint. Look in column "2" for this number, and directly opposite in column "3" will be found the correct photographic-exposure time for largest stop and fastest plates without moving any part of the meter. If other stops are wanted, draw down the number of seconds found until it is opposite the figure "4" in column "1" and the time is shown for any stop above in either system as far up as the slide extends. If the actinometer time should be minutes instead of seconds, the exposure time will be found in column "4" in seconds at once, and if the actinometer time be found instead of minutes the time will be seen at once in minutes in column "4," and this without any mental calculation or change in the meter, a thing not accomplished by any other instrument.

The meter as above described can be used for both outside and inside work and will cost to manufacture only about one-fourth that of any other device used for the purpose and is the only one which has the tables so arranged that the exposure time, no matter what it may be, can be seen at once from the actinometer time without any mental calculation, and this for either system of stops. Owing to the peculiar construction of the tables nearly every problem relating to exposure can be worked out from them; but for ordinary exposures the time is seen at once.

I wish it to be understood that I do not limit myself to the precise construction shown in my drawings and heretofore particularly described in my specification, but reserve to myself the right to make such alterations and changes therein for the better carrying out of my invention without departing from the essential features therein and the true spirit and scope thereof.

What I claim is—

A photographic-exposure meter comprising a holder having spaced flanges with designations and columns of numerals thereon and adapted to contain a strip of sensitized material, a sliding strip having on one end a color, and a sliding strip provided with columns of numerals, said parts being arranged so as to coact together, substantially as and for the purpose specified.

Signed by me at Cleveland, county of Cuyahoga, and State of Ohio, this 6th day of August, 1901.

RUEL W. WHITNEY.

Witnesses:
E. B. DONNELLY,
W. E. DONNELLY.